May 29, 1962     A. E. BRENNEMANN     3,037,196
LOGICAL CIRCUIT ELEMENT

Filed July 9, 1956

INVENTOR.
ANDREW E. BRENNEMANN
BY
AGENT

May 29, 1962  A. E. BRENNEMANN  3,037,196
LOGICAL CIRCUIT ELEMENT
Filed July 9, 1956  2 Sheets-Sheet 2

3,037,196
LOGICAL CIRCUIT ELEMENT
Andrew E. Brennemann, Poughkeepsie, N.Y., assignor to International Business Machines Corporation, New York, N.Y., a corporation of New York
Filed July 9, 1956, Ser. No. 596,707
3 Claims. (Cl. 340—173.2)

The present invention relates to circuits which utilize piezoelectric or ferroelectric elements and more particularly to logical and switching circuits wherein outputs are produced in response to sonic waves propagated in an element of this type when input pulses are selectively applied by separately operated input pulse sources.

Piezoelectricity has been defined, as pointed out by W. G. Cady, at page 4 of his volume entitled "Piezoelectricity" which was published in 1946, as "electrical polarization produced by mechanical strain in crystals belonging to certain classes, the polarization being proportional to the strain and changing sign with it." It is further pointed out that such crystals have a converse property in that they become strained when subjected to a polarizing field. A related phenomenon is that of "electrostriction" which is a property of many materials that results in their being deformed when subjected to electrical stress. Electrostriction and piezoelectricity may be distinguished in that the strain or deformation, produced as the result of electrostriction, is proportional to the square of the electric stress, whereas the relationship between strain and polarizing field, in a piezoelectric crystal, is linear.

Piezoelectric crystals are characterized by a spontaneous polarization in the absence of an applied field. Ferroelectric crystals display this spontaneous polarization, and are further characterized in that they exhibit two different states of spontaneous polarization in different directions and can be caused to assume either of these states by applying a polarizing field of sufficient magnitude and proper polarity. A plot of polarization versus applied electric field for a ferroelectric material is in the form of a hysteresis loop, which, for certain materials in the form of single crystals, is essentially square. When such a crystal is in one of its remanent states, it is required, in order to reverse the polarization in the crystal to the opposite state, that an electric field greater than a certain minimum field be applied to the crystal for a certain period of time. The electric field necessary to switch a ferroelectric crystal from one of its stable states of remanent polarization to the other is termed the coercive field for the crystal. The application, for a brief interval of time, of a field less than the required coercive field, is effective to change the polarization only while the field is applied and the crystal returns to essentially its initial state when the field is removed.

When subjected to relatively small fields of brief duration, the change in polarization effected in a ferroelectric crystal is accompanied by a deformation. The relationship between this change in polarization and strain or deformation is, for fields of this magnitude, essentially linear and the effect may, in light of the distinction drawn above, be considered piezoelectric. When the field applied to a crystal, initially in remanent state of polarization in one direction, is of sufficient intensity and duration to switch the direction of polarization in the crystal, that is to rotate the direction of polarization 180 degrees, the crystal when it assumes its remanent state in the opposite direction would be in a different state of strain if the effect were piezoelectric and therefore linear. Such is not the case since the effect during a switching operation is electrostrictive, that is, the deformation is proportional to the square of the polarization and for this reason the crystal exists in the same strained state when at remanence in either direction. Further, when a crystal, in a remanent state of polarization in either direction, is subjected to a polarizing field of a polarity to increase the polarization in that direction, the deformation produced is in the same direction regardless of the initial direction of polarization in the crystal. Thus, it may be stated that, regardless of the initial direction of polarization in a crystal, the deformation produced by an applied field of a polarity proper to increase the polarization is in one direction, whereas the deformation produced by an applied field of a polarity to decrease the polarization is in the other direction. When the applied field is of proper polarity and sufficient intensity to switch the direction of polarization in the crystal, two effects might be expected. First, when the field is initially applied it is tending to decrease polarization in the initial direction and thereby produces a deformation in a first direction. Secondly, as the polarization is reversed, the continued application of the field increases the polarization in the reverse direction thereby producing a deformation in a second direction opposite to that initially produced. It has been found that where the field applied is sufficiently large, this first effect or deformation is to a large degree eliminated. This is believed to be due to the fact that the application of a sufficiently large field is effective to instantaneously reverse the direction of polarization in the crystal and because of the square law relationship, this instantaneous change produces little or no deformation. Thus, the only deformation is that produced as the result of the field increasing the polarization in the reverse direction. This deformation is in the same direction as would be produced were the crystal initially subjected to a field of opposite polarity, that is a field effective to increase the initial polarization in the crystal. From the above it may be seen that, where the fields applied are of sufficient intensity, fields of either polarity are capable of producing deformations of the same nature, which deformations are sonically propagated in the crystal and may be utilized to produce unipolar outputs between a pair of electrodes connected to the crystal.

The primary object of the present invention is to provide ferroelectric and piezoelectric EXCLUSIVE OR circuitry.

A further but related object is to provide an improved delay line device.

A further object is to provide an EXCLUSIVE OR circuit wherein outputs are developed by sonic waves propagated in a crystal as the result of the application of a signal to one or the other of a pair of input electrodes connected to the crystal.

These objects are realized by providing as a logical switching element a body of material having ferroelectric and thus, piezoelectric properties. For the illustrative purposes of this disclosure, the element of the preferred embodiment is a bar of single crystal barium titanate. Attached to opposite faces at one end of the crystal are a pair of input electrodes, and similarly attached at the other end of the bar of barium titanate are a pair of output electrodes. Separate means are provided to apply pulses of like polarity to the input terminals. When either terminal is energized exclusively, the barium titanate is thereby subjected to an electric field which changes the total polarization in the crystal. This change in polarization strains the barium titanate between the input electrodes causing a sonic wave to be propagated in the bar. This sonic wave effects a similar straining of the barium titanate between the output electrodes and causes an output pulse to be there developed. The output pulse is, of course, delayed a time dependent upon both the distance between input and output electrodes and the speed of propagation of the sonic wave in the barium titanate. When inputs of like polarity are applied coincidently to the input electrodes, there is no electric field established; the barium titanate between the input electrodes is not strained and no output is produced between the output electrodes.

In one mode of operation the input pulses are of insufficient magnitude to switch the barium titanate therebetween from one state of polarization to the other and the effect is similar to that realizable with any material having piezoelectric properties. According to a second mode of operation larger input pulses are utilized, which pulses are effective to switch the direction of polarization in the barium titanate between the input electrodes. A further embodiment illustrates the manner in which circuitry, operated in accordance with this novel mode of operation, is usable to nondestructively interrogate the state of polarization of a ferroelectric memory capacitor in response to the exclusive application of an interrogation signal to one or the other of a pair of interrogation terminals coupled sonically to the memory capacitor.

Thus, a further object of the invention is to provide a delay device of the sonic type having a novel and improved mode of operation.

Another object is that of providing circuitry wherein sonic waves are employed in nondestructively interrogating a ferroelectric memory capacitor in accordance with the EXCLUSIVE OR logical function.

Other objects of the invention will be pointed out in the following description and claims and illustrated in the accompanying drawings, which disclose, by way of example, the principle of the invention and the best mode, which has been contemplated, of applying the principle.

Figure 1:
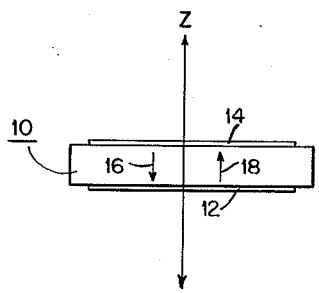
FIG. 1 is a diagrammatic showing of an electroded crystal of barium titanate.
Figure 3:
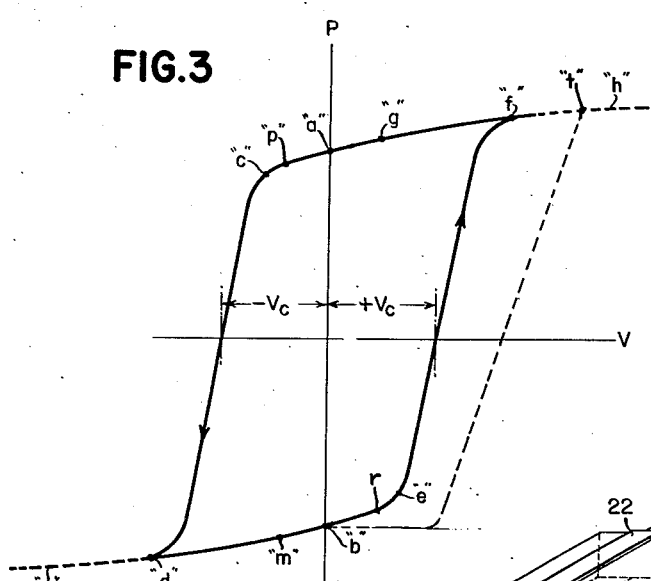
FIG. 3 shows a hysteresis loop obtained by plotting polarization versus applied voltage for an electrical crystal of barium titanate.

Referring now to FIG. 1, there is shown a bar of crystalline barium titanate 10, which has connected to its opposite faces, electrodes 12 and 14. The crystal 10 and electrodes 12 and 14 form a capacitor which, since the crystal has ferroelectric properties, is capable of assuming two stable states of remanent polarization in opposite directions. These stable states are represented at "a" and "b" on the hysteresis loop of FIG. 3, the letter "a" representing the remanent condition in the direction indicated by an arrow 16 in FIG. 1 and the letter "b" representing the remanent condition in the direction indicated by arrow 18. The coercive voltage, which is the voltage necessary to reverse the direction of polarization in the crystal, is represented in FIG. 3 by the arrows designated Vc. When, with the crystal in the remanent condition indicated at "a," a negative pulse in amplitude greater than Vc volts is applied to the electrode 14 in FIG. 1, the loop of FIG. 3 is traversed along the portion "acd" and, upon termination of the pulse, the barium titanate assumes the remanent state of polarization indicated at "b." If a positive pulse, in magnitude greater than Vc volts, is then applied to electrode 14, the loop is traversed along the portion "bef" and, upon termination of the pulse, the barium titanate assumes the stable state of remanent polarization indicated at "a." Where the pulses supplied are less than the coercive voltage or are of incorrect polarity to switch the polarization, only the horizontal portions of the loop are traversed and, upon termination of the pulse, the crystal assumes essentially its initial state of remanent polarization.

Figure 2:
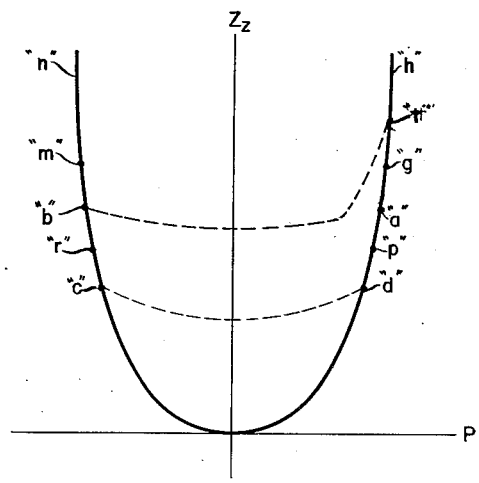
FIG. 2 is a diagrammatic showing of the relationship between strain and polarization for a crystal of barium titanate.

FIG. 2 illustrates graphically the relationship between the changes in dimension and polarization which are effected in the crystalline bar 10 when an electric field is applied between electrodes 12 and 14. The vertical axis designated $Z_z$ represents dimensional changes in the vertical direction of the similarly designated arrows shown in FIG. 1. Tht horizontal axis P is representative of polarization in the crystal, polarization in the direction of the arrow 16 in FIG. 1 being plotted to the right in FIG. 2 and polarization in the direction of arrow 18 being plotted to the left. The parabolic nature of the curve of FIG. 2 indicates the electrostrictive relationship between deformation and applied electric field. When the bar of barium titanate is in a remanent condition at "a" of FIG. 3, the condition of strain and polarization is as represented by the same letter in FIG. 2. The remanent condition "b" on the hysteresis loop of FIG. 3 is similarly represented by the same letter in FIG. 2. Note should be made of the fact that the dimensional state of the barium titanate is essentially the same for both remanent states, and when in either remanent state, as is indicated at "a" and "b," the relationship between dimensional and polarization changes effected by the application of a small field is essentially linear. When, with the material in the remanent condition "a," a voltage is applied to electrode 14 effective to cause the hysteresis loop of FIG. 3 to be traversed from "a" to "g," the relationship between applied voltage and polarization is essentially linear, as is the relationship between polarization and the dimensional changes effected in the barium titanate. The effect is similar for pulses of larger magnitude which are of a polarity to increase the initial remanent polarization in the barium titanate and changes effected in polarization and dimension for various voltages are indicated by the letters "h," "m" and "n" on FIGS. 2 and 3. The essential linearity of the relationship is due to the fact that the initial spontaneous polarization in the material is exceedingly large in comparison to the changes in polarization produced by the application of the electric fields. The magnitude of these changes relative to the initial spontaneous polarization is exaggerated in FIG. 2. It should be noted that in each of these cases where the applied pulse is of a polarity proper to increase the polarization in the material, the deformation of the barium titanate is in the form of an expansion of the material in the "Z" direction indicated by the arrows in FIG. 1. The relationship is similarly linear where the pulses applied to the crystalline barium titanate are of a polarity to reverse the direction of polarization in the barium titanate but are in magnitude less than the coercive voltage, that is, a positive pulse applied to electrode 14 with the material initially in the remanent state at "b" in FIG. 3 or a negative pulse applied to electrode 14 with the material initially in the remanent state at "a" in FIG. 3. The excursions on the hysteresis loop and the corresponding changes in the plot of strain versus polarization are represented by the segments "ap" and "br" in FIGS. 2 and 3. Thus, where pulses, in magnitude less than the coercive voltage, are applied, the polarization changes are essentially proportional to the dimensional changes and change sign with them.

When, with the barium titanate in a remanent condition at "a" or "b," a pulse of proper polarity and sufficient magnitude to reverse the direction of polarization is applied to electrode 14, the relationships are, as is depicted on the curves of FIGS. 2 and 3, nonlinear. However, though these curves are representative of the basic relationship between the plotted quantities they are not exact in depicting the relationships for all modes of operation. For example, the hysteresis loop of FIG. 3 is representative of the relationship between polarization and voltage when a barium titanate crystal is subjected to an alternating voltage having a particular amplitude, frequency and wave shape. Most such loops are obtained by applying a sine wave signal having a frequency of 60 cycles per second. That such a plot does not represent with exactness the relationship between polarization and applied voltage is due to the fact that the switching phenomenon is dependent not only upon the amplitude of the signal applied, but upon the wave shape and the duration of the signal at a particular amplitude level. Where, with the barium titanate in the remanent condition "$b$," a positive square pulse in magnitude much larger than the coercive voltage is applied to the crystal, the relationship between polarization and applied voltage during switching might better be represented by the dotted segment "$bt$." Once the polarization is switched, the continued application of the signal voltage causes the loop to be traversed along the portion "$fh$".

Similarly, the curve of FIG. 2 would indicate that, when the direction of polarization in the barium titanate is switched, the strain in the material is first reduced to a point where no strain exists and then the strain is increased again in the direction of the initial strain. Such is not the case and it is believed that with the application of a sine wave such as utilized in obtaining the hysteresis loop of FIG. 3, the relationship between strain and polarization is more correctly represented in FIG. 2 by the dotted curve extending from "$c$" to "$d$". When a square pulse, in magnitude much greater than the coercive voltage, is applied, the relationship between strain and deformation is believed to be more correctly represented by the dotted curve extending in FIG. 2 from "$b$" to "$t$". From this curve it may be seen that when such a pulse is applied, there is very little deformation in the "compression direction" as the polarization is reversed. Since the switching, upon the application of such a pulse, is accomplished in a very short time this deformation is negligible and the primary dimensional change is an "expansion" which occurs as the applied pulse is increasing the polarization in the reverse direction. Thus, it may be seen that where pulses of this nature are applied the deformation produced is essentially the same whether the pulses are of a polarity proper to increase the initial direction of polarization or are of opposite polarity and effective to reverse the direction of polarization in the crystal.

Figure 4:
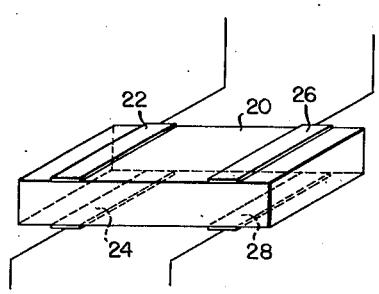
FIG. 4 illustrates the manner in which the connections are made to a barium titanate crystal in order to provide switching and delay elements usable in circuitry operated in accordance with the principles of the invention.
Figure 5:
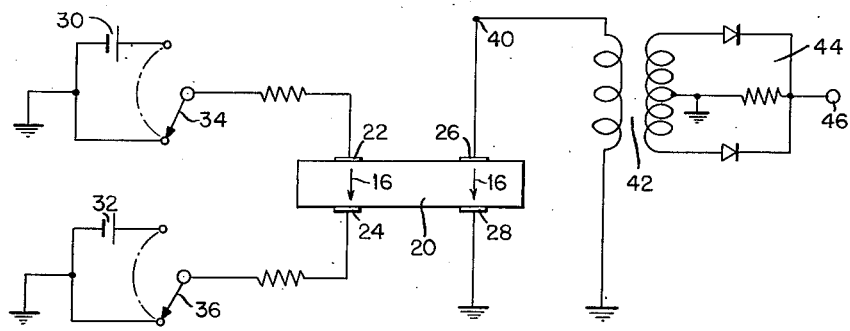
FIGS. 5 and 6 show different embodiments of EXCLUSIVE OR circuits constructed for operation in accordance with the principles of the invention.

Referring now to FIG. 4, there is shown the manner in which electrodes are attached to a portion of barium titanate, in the form of a bar 20, in constructing a switching element adaptable for use in circuitry operated in accordance with the principles of the present invention. The bar configuration shown is illustrative and the bar 20 might be merely a part of a larger crystal of barium titanate. A pair of input electrodes 22 and 24 are connected to opposite faces at one end of the bar and a pair of output electrodes 26 and 28 at the other end of the bar. An element, so constructed, is shown in the circuit of FIG. 5 with the input and output circuitry necessary to form an EXCLUSIVE OR circuit which in operation utilizes only the piezoelectric properties of the material. The circuit is operable with the barium titanate between the input and output electrodes polarized in either direction, but, for the illustrative purposes of the disclosure, the bar of barium titanate is considered to be in the remanent state of polarization in the direction indicated by the arrows 16, which state is indicated in FIGS. 2 and 3 at "$a$." Inputs to the EXCLUSIVE OR circuit are supplied by a pair of signal sources 30 and 32, under control of a pair of switches 34 and 36. With switches 34 and 36 in the condition shown, each of the electrodes is at ground potential and the barium titanate remains in the remanent condition represented in FIGS. 2 and 3 by the letter "$a$."

When one of the switches is thrown to complete a circuit from the associated signal sources to thereby raise the potential of one of the electrodes, the barium titanate is subjected to an electric field effective to change the polarization and thus the strain in the barium titanate. The circuitry is so constructed that the electric field thus established is less than the coercive field necessary to reverse the direction of polarization in the capacitor. For example, if switch 34 is transferred to allow signal source 30 to apply a positive pulse to electrode 22, the electric field intensity is sufficient only to cause the loop of FIG. 3 to be traversed along segment "$ag$" and upon restoring switch 30 to the condition shown to terminate the pulse, the barium titanate again assumes its initial state of polarization at "$a$." It should be noted that the excursion "$ag$" represents an increase in polarization and is effective as is indicated in FIG. 2 to "expand" the barium titanate between the electrodes 22 and 24. When switch 36 is similarly transferred and then restored to apply a positive pulse to the electrode 24, the loop of FIG. 3 is traversed from "$a$" to "$p$" and, upon termination of the pulse, resumes its initial remanent condition at "$a$." Note should be made of the fact that the application of pulses of the same polarity to the two electrodes produce fields in opposite directions. The excursion along segment "$ap$" represents a decrease in polarization and thus, the barium titanate between electrodes 22 and 24 is then contracted as is indicated in FIG. 2. Such a deformation, whether expansion or contraction, causes a sonic wave to be transmitted down the body of the barium titanate. This wave, when it reaches the barium titanate between output electrodes 26 and 28, causes a voltage to be there produced, which voltage is manifested in the form of a pulse at a terminal 40. The sonic waves propagated are of opposite nature, that is, the wave transmitted, as a result of transferring switch 34 tends to "expand" the barium titanate, whereas the wave transmitted, as the result of transferring switch 36, tends to contract the barium titanate. The "expansion" wave tends to increase the polarization in the barium titanate between electrodes 26 and 28 whereas the "contraction" wave tends to decrease the polarization. For this reason the output pulse developed at terminal 40, as the result of the application of a signal by source 30, is of opposite polarity to the output developed as the result of the application of a signal by source 32. This output is applied to a transformer 42, the secondary winding of which is connected through a full wave rectifier 44 to an output terminal 46 at which unipolar outputs indicative of the application of a pulse by either signal source, exclusively, are manifested. When either switch 34 or 36 is restored to its initial position after causing a pulse to be applied to the associated input electrode 22 or 24, the barium titanate between the input electrodes reassumes its initial state at "$a$." This change in polarization effects a deformation in an opposite direction to that originally produced when the input pulse is applied. This deformation causes a sonic wave, effective to produce an output voltage of opposite polarity to that originally produced between the output electrodes, to be transmitted down the bar of barium titanate. As a result, when either switch 34 or 36 is transferred and then restored, successive pulses of opposite polarity are developed at terminal 40 which pulses appear as successive pulses of like polarity at output terminal 46. When both of the switches 34 and 36 are transferred coincidently, the electrodes 22 and 24 are maintained at the same potential; there is no electric field established across the barium titanate, and no deformation produced. Thus, when both switches are transferred coincidently there is no sonic wave transmitted and no output developed at terminal 46.

It should be noted that the EXCLUSIVE OR circuit of FIG. 5 may be operated in the same manner with signals of either polarity and with the barium titanate between the input and output electrodes either polarized in the same direction as shown or in opposite directions. The only effect resulting from changes of this nature is in the polarity of the pulses developed at terminal 40.

Figure 6:
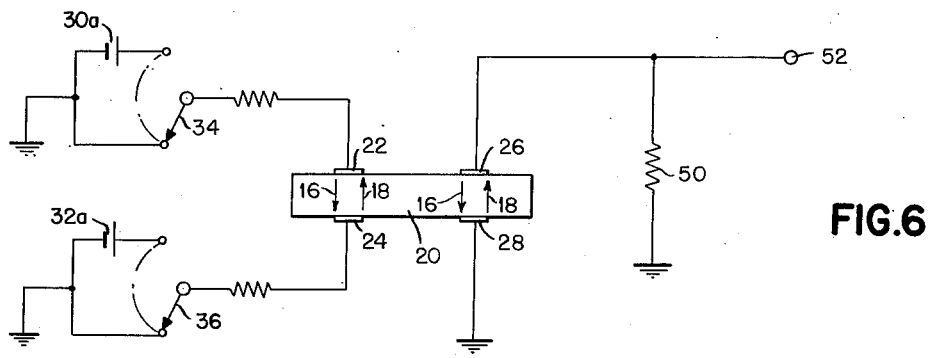

There is shown in FIG. 6 a further embodiment constructed for operation in accordance with the principles of the invention. The circuit is similar to the embodiment of FIG. 5 in that it utilizes as a switching element a bar of barium titanate 20 having a point of input electrodes 22, 24 and output electrodes 26, 28 attached at different positions on the bar. As in the former embodiment, input signals are applied to this circuit by selectively transferring switches 34 and 36 and functionally the operation is the same in that, when either of these switches is transferred, with the other remaining in the position shown, an output voltage is produced between the output electrodes. When the switches are transferred coincidently, no output voltage is produced between the output electrodes. The difference between the two embodiments lies in the fact that, in the embodiment of FIG. 6, the signals are applied by a pair of signal sources 30a and 32a. Each of these sources is effective, when the corresponding switch is transferred, to apply to the barium titanate between the input electrodes 22 and 24 a voltage which exceeds the coercive voltage required to switch the direction of polarization in the material. If, with barium titanate between electrodes 22 and 24 initially in a remanent state of polarization in the direction indicated by arrow 18, switch 34 is transferred, a voltage is applied by source 30a of sufficient magnitude to reverse the direction of polarization in the barium titanate. The pulses supplied by the signal sources 30a and 32a are preferably pulses which attain an amplitude much in excess of the coercive voltage in an exceedingly short time. The remanent condition, in the direction of arrow 18, is indicated at "b" in FIG. 3. The application of such a pulse causes a change in polarization which is represented by the dotted curve "bt" as the crystal is switched, and then by the portion "th" as the applied voltage is effective to increase the polarization in the reversed direction. As has been pointed out above, the switching, upon the application of a pulse of this nature is extremely fast and is accompanied by only a small change in the dimensions of the crystal. The principal deformation produced, is as before explained, due to the increase of polarization in the reverse direction after the initial switching is accomplished. Thus, when a pulse is supplied by either pulse source which is of a polarity to reverse the direction of polarization, the barium titanate between the input electrodes is expanded. The same is true, of course, where the input pulse is of a polarity to increase the polarization in the material. For example, if the barium titanate is initially in the condition "b," the dimensional change which occurs, when switch 34 is transferred, is represented in FIG. 2 by the portion of curve "bth." When, with the barium titanate initially in the same condition at "b," switch 36 is transferred, the resulting dimensional change is represented in FIG. 2 by the segment "bmn."

Thus, it may be seen that, where pulses of this nature, that is pulses having an amplitude in excess of the coercive voltage and effective to switch the direction of polarization in the barium titanate in a very short time, are applied to the input electrodes, the barium titanate is always expanded during essentially the same time interval regardless of the initial state of polarization in the material. As a result, a sonic wave tending to expand the barium titanate is transmitted down the bar 20 when either switch is transferred with the other remaining in the condition shown. It should be noted that the effect is the same, that is, a sonic wave tending to expand the barium titanate is transmitted through bar 20, when the signal sources 30a and 32a are effective to supply negative voltages to the connected electrodes, instead of positive voltages as shown. The output is developed across a resistor 50, which is connected between electrode 26 and a reference potential, here shown as ground, and is manifested at an output terminal 52. The polarity of the output pulse developed when either switch is transferred, is dependent only upon the initial state of polarization in the barium titanate between electrodes 26 and 28. Referring to FIG. 2, it can be seen that, with the barium titanate initially at remanent state "a," a sonic wave tending to expand the material causes an increase in polarization in the same direction. The direction of the polarization change is then in the direction of the arrow 16 shown between electrodes 26 and 28 in FIG. 6. When the barium titanate is initially in the remanent state "b," that is, at remanence in the direction indicated by arrow 18, the expansion of the barium titanate effected by the sonic wave, causes an increase in polarization in this direction. When the change in polarization in the barium titanate between the output electrodes is in one direction, for example in the direction of the arrow 16, the polarity of the output pulse developed at terminal 52 is negative; whereas when the change in polarization is in the direction of arrow 18, the polarity of the output pulse developed at terminal 52 is positive.

It should be noted that upon the termination of an input signal applied to either input electrode 22 or 24, the barium titanate reassumes a remanent state, thereby causing a sonic wave tending to contract the barium titanate to be transmitted through bar 20. Thus, each pulse produced at output terminal 52, as the result of transferring either switch 36 or 34 to cause the associated signal source to exclusively apply a signal to one of the input electrodes, is followed by a pulse of opposite polarity. Either the first or the second of these pulses, produced by the leading and trailing edges of the input signals, respectively, can be eliminated by inserting a properly poled diode in the output circuit, for example, between electrode 26 and resistor 50. When both switches 36 and 34 are transferred coincidently, there is, of course, no voltage drop across the barium titanate between the input electrodes, no sonic wave produced and no voltage developed between electrodes 26 and 28.

Figure 7:
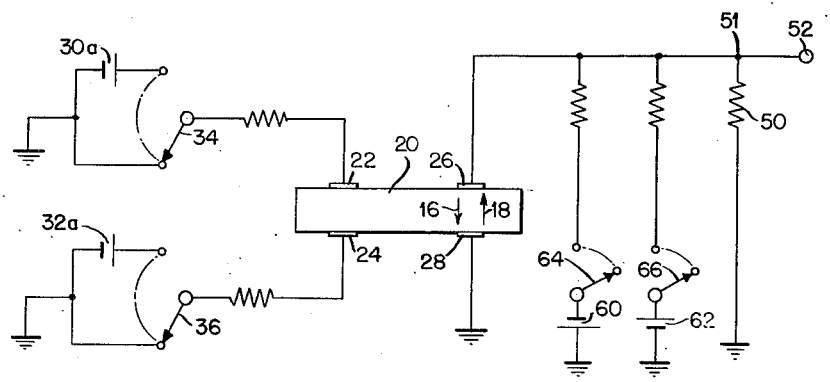
FIG. 7 is a diagrammatic representation of a memory circuit constructed in accordance with the principles of the invention.

Because of the fact the polarity of output pulses developed in the EXCLUSIVE OR circuit of FIG. 5 is dependent only upon the state of polarization of the barium titanate between output electrodes 26 and 28, the same principle of operation may be utilized to sonically and nondestructively interrogate a barium titanate memory capacitor in accordance with the EXCLUSIVE OR logical function. Such circuitry is shown in the embodiment of FIG. 7. This embodiment is the same as that of FIG. 6, with the exception that a pair of signal sources 60 and 62, for applying read pulses under the control of a pair of switches 64 and 66 have been added. In this embodiment the electrodes 26 and 28 together with the barium titanate therebetween may be considered as a memory capacitor capable of storing binary information. For example, the remanent condition at "a" in FIG. 3, which represents remanence in the direction of arrow 16, may be designated the binary one representing condition, and the condition of remanence in the direction of arrow 18, indicated at "b" in FIG. 3, may be designated the binary zero representing condition. Information is read into the capacitor by selectively closing switches 64 and 66. The momentary closing of switch 64 allows signal source 60 to apply a pulse to the memory capacitor, which pulse is effective, regardless of the initial state of the capacitor, to cause the capacitor, upon termination of the pulse, to assume the binary zero condition at "b" in FIG. 3. The signal source 62 is similarly effective, upon operation of switch 66, to cause the capacitor to assume the binary one representing condition at "a" in FIG. 3.

The memory capacitor may be interrogated in accordance with the EXCLUSIVE OR logical function under control of switches 36 and 34. When these switches are operated coincidently, there is no sonic wave produced and the memory capacitor is not interrogated. However, when either switch is operated exclusively, a sonic wave is produced which causes an output to be developed at terminal 52. As has been pointed out above, the polarity of the output signal is dependent only upon the direction of polarization in the barium titanate between electrodes 26 and 28 and thus, the polarity of the output indicates whether the memory capacitor is in the binary one or binary zero representing condition. Since, after the interrogation pulse has been terminated and the sonic waves caused both the leading and trailing edges of the interrogation pulse have passed through the barium titanate between electrodes 26 and 28, the memory capacitor reassumes its initial remanent state, the interrogation is nondestructive. If in a particular application it is desired that the output upon interrogation be in the form of a pulse at terminal 52 when the memory capacitor is in one remanent state, and no pulse when the memory capacitor is in the other remanent state, a properly poled diode may be placed in the output circuit between junction 51 and terminal 52. The outputs resulting from the leading and trailing edges of the interrogation pulses are successive, being separated in time an amount which depends upon the duration of the interrogation pulses, and these pulses may be distinguished by time sampling the output. This can be accomplished by gating the output with a gate opened at the proper time during each interrogation cycle with a clock pulse.

Summarily it might be said of the embodiments of FIGS. 5, 6 and 7 that, in each embodiment, a signal may be applied to each electrode 22 and 24 by the associated signal source during selected ones of a plurality of succeeding time intervals so that, during certain time intervals, a signal is applied exclusively to one electrode and, during other time intervals, signals are applied coincidently to both electrodes, and that the outputs developed are indicative of the time relationship in which the signals are applied and also the initial direction of polarization in the barium titanate between the output electrodes 26 and 28. In each of the above described embodiments, the outputs are, of course, developed after a time delay which is governed both by the distance between the input and output electrodes and the speed with which the sonic waves are transmitted in the bar of barium titanate.

Figure 8:
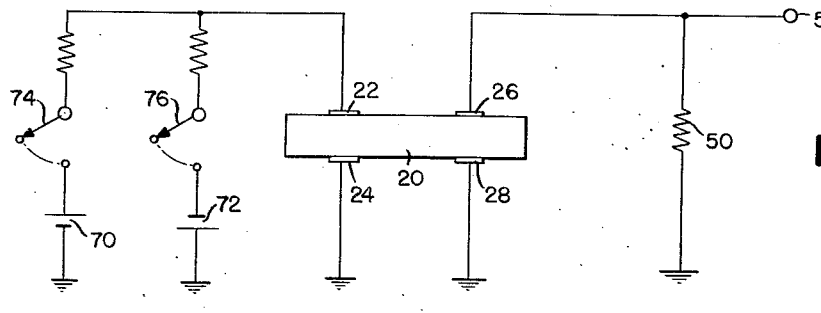
FIG. 8 is a diagrammatic representation of a delay circuit constructed for operation in accordance with the principles of the invention.

The embodiment of FIG. 8 shows a simple delay circuit utilizing a bar 20 of barium titanate having input and output electrodes connected in the same manner as shown in the previous embodiments. Inputs to the delay line are supplied by signal sources 70 and 72 under control of switches 74 and 76. These signal sources are similar to the sources 30a and 32a, shown in the embodiment of FIG. 7, in that they are effective to apply to electrode 22 pulses which attain an amplitude greater than the coercive voltage in a short time. Signal source 72 is effective, when switch 76 is operated, to apply a negative pulse to electrode 22 and source 70 is effective, when switch 74 is operated, to apply a positive pulse to this electrode. As has been explained above, pulses of this nature are effective, regardless of their polarity and also regardless of which remanent condition the barium titanate between electrodes 22 and 24 is in, to cause a sonic wave tending to expand the barium titanate to be transmitted in bar 22. As a result the outputs manifested at terminal 52, after a predetermined time delay, are uniform for inputs of either polarity. As before, the trailing edges of the input pulses cause outputs of opposite polarities to be developed at terminal 52. The outputs developed as the result of the sonic wave produced by the leading edges of the input pulses occur first and are, of course, of opposite polarity to the succeeding pulses developed as a result of the trailing edge of the input pulses. The pulses may be distinguished by time sampling or by placing a properly poled diode in the output circuit, for example, between electrode 26 and resistor 50. In the latter case, according to the manner in which the diode is connected, either the pulses developed as the result of the leading edge of the input pulses, or the pulses developed by the trailing edge of the input pulses appears at output terminal 52. With a diode thus connected in the output circuit the circuit may be viewed as a rectifier capable of producing at output terminal 52 unipolar outputs in response to the application of discrete pulses of either polarity to input electrode 22.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A circuit comprising a body of ferroelectric material; first and second electrodes separated by a first portion of said body of ferroelectric material; first signal means coupled to at least one of said electrodes for applying a polarizing field of one polarity to said first portion of said body; second signal means independent of said first signal means and coupled to at least one of said electrodes for applying a polarizing field of opposite polarity to said first portion of said body; said polarizing field applied by either of said first and second signal means being effective to strain said first portion of said body of material in the same direction; and output means connected to a second portion of said body for manifesting outputs in response to a polarizing field applied by one or the other of said signal means, the polarity of said outputs being independent of the polarizing field applied by said first or second signal means; said output means consisting of third and fourth electrodes separated by said second portion of said body.

2. A memory circuit comprising a body of ferroelectric material; first and second electrodes separated by a first portion of said body of ferroelectric material; said electrodes and said first portion forming a first capacitor capable of assuming at least two different stable states of remanent polarization; means coupled to at least one of said electrodes for selectively causing said first capacitor to assume either of said states; and means for nondestructively determining the state of said first capacitor including third and fourth electrodes separated by a second portion of said body of ferroelectric material, said third and fourth electrodes and said second portion forming a second ferroelectric capacitor capable of assuming at least first and second states of remanent polarization in first and second directions, first signal means for applying to said third electrode signals of sufficient magnitude and proper polarity to be effective when said second capacitor is in said first state to switch said direction of polarization in said second capacitor, second signal means for applying to said fourth electrode signals of sufficient magnitude and of proper polarity to be effective when said second capacitor is in said second state to switch the direction of polarization in said second capacitor, each of said signals applied by said first and second signal means being effective to cause to be transmitted in said body a sonic wave effective to strain said first portion of said body in the same direction, and means coupled to said first capacitor for manifesting outputs when sonic waves are transmitted in said first portion of said body, whereby the polarity of said outputs is indicative of the state of said first capacitor.

3. A logical circuit comprising a body of ferroelectric material; first and second electrodes separated by a first portion of said body of material; third and fourth electrodes separated by a second portion of said body of material; said first and second portions of material being capable of independently assuming first and second directions of polarization; first signal means coupled to said first electrode for applying signals thereto; second signal means coupled to said second electrode for applying signals thereto; said signals applied by either of said first and second signal means being effective in the absence of a signal applied coincidently by the other of said means to strain said first portion of said body of material; a signal applied by either of said first and second signal means being effective to render a signal coincidently applied by the other of said signal means ineffective to strain said first portion of said body of material; the magnitude of a signal supplied by either of said first and second signal means being greater than the coercive voltage required to switch the direction of polarization in said first portion of said body of material and the direction of said strain being thereby independent of the polarity of said signal; said strain effected by signals applied by either of said first and second signal means effective to subsequently strain said second portion of said body of material and thereby cause an electrical output manifestation to be developed between said third and fourth electrodes, the polarity of said electrical manifestation being determined both by the direction of polarization of said second portion of said body of material and the direction of the strain supplied to said second portion of said body of material.

References Cited in the file of this patent

UNITED STATES PATENTS

| | | |
|---|---|---|
| 1,450,246 | Cady | Apr. 3, 1923 |
| 2,659,869 | Allison | Nov. 17, 1953 |
| 2,666,195 | Brachelet et al. | Jan. 12, 1954 |
| 2,711,515 | Mason | June 21, 1955 |
| 2,714,708 | Howatt et al. | Aug. 2, 1955 |
| 2,737,583 | Crooks et al. | Mar. 6, 1956 |
| 2,742,614 | Mason | Apr. 17, 1956 |
| 2,754,481 | Hirsch | July 10, 1956 |
| 2,782,397 | Young | Feb. 19, 1957 |
| 2,972,734 | Anderson | Feb. 21, 1961 |